(12) United States Patent
Biskop (10) Patent No.: US 11,351,717 B2
(45) Date of Patent: Jun. 7, 2022

(54) DUPLEX PRINTING OF THREE-DIMENSIONAL STRUCTURES WITH DEFORMATION CONTROL

(71) Applicant: LUXEXCEL HOLDING B.V., Eindhoven (NL)

(72) Inventor: Joris Biskop, Vlissingen (NL)

(73) Assignee: LUXEXCEL HOLDING B.V., Eindhoven (NL)

(*) Notice: Subject to any disclaimer, the term of this patent is extended or adjusted under 35 U.S.C. 154(b) by 363 days.

(21) Appl. No.: 16/028,560

(22) Filed: Jul. 6, 2018

(65) Prior Publication Data
US 2019/0009455 A1  Jan. 10, 2019

(30) Foreign Application Priority Data
Jul. 10, 2017 (EP) .................................. 17180620

(51) Int. Cl.
*B29C 64/112* (2017.01)
*B33Y 10/00* (2015.01)
(Continued)

(52) U.S. Cl.
CPC .......... *B29C 64/112* (2017.08); *B29C 64/245* (2017.08); *B33Y 10/00* (2014.12);
(Continued)

(58) Field of Classification Search
CPC ..... B29C 64/112; B29C 64/245; B29C 64/40; B33Y 10/00; B33Y 30/00; B33Y 80/00
See application file for complete search history.

(56) References Cited

U.S. PATENT DOCUMENTS 9,399,323 B1* 7/2016 Lu ........................... B33Y 30/00
2002/0079611 A1* 6/2002 Ellison ..................... B29C 51/38
264/247
(Continued)

FOREIGN PATENT DOCUMENTS

DE 102014004870 A1 * 8/2015 ............. B22F 10/20
DE 102014004870 A1 10/2015
(Continued)

OTHER PUBLICATIONS

Extended European Search Report for European Application No. EP17180620.1; dated Jan. 8, 2018.

*Primary Examiner* — Matthew J Daniels
*Assistant Examiner* — Gregory C. Grosso
(74) *Attorney, Agent, or Firm* — The Dobrusin Law Firm, P.C.

(57) ABSTRACT

A method for duplex printing a three-dimensional structure by depositing droplets of printing ink at least partially side by side and one above the other, including: depositing droplets of printing ink in a first printing step in order to build up an intermediate first pre-structure, depositing droplets of printing ink in a second printing step in order to build up an intermediate second pre-structure on at least one side of the first pre-structure, rotating the first pre-structure and arranging the first pre-structure on a support structure in a rearrangement step between the first and the second printing step, wherein an extension of the first pre-structure is arranged on a carrier substructure of the support structure and a main body of the first pre-structure is arranged on an deformation-control substructure of the support structure. The teachings further relate to a duplex printed three-dimensional structure as well as a duplex printer.

16 Claims, 2 Drawing Sheets

(51) Int. Cl.
   *B29C 64/245*   (2017.01)
   *B33Y 30/00*    (2015.01)
   *B33Y 80/00*    (2015.01)
   *B29C 64/40*    (2017.01)

(52) U.S. Cl.
   CPC .............. *B33Y 30/00* (2014.12); *B29C 64/40* (2017.08); *B33Y 80/00* (2014.12)

(56) References Cited

U.S. PATENT DOCUMENTS

| | | | |
|---|---|---|---|
| 2013/0122261 A1 | 5/2013 | Barnes et al. | |
| 2015/0093544 A1* | 4/2015 | Van De Vrie | B33Y 10/00 |
| | | | 428/156 |
| 2015/0192919 A1* | 7/2015 | Sketch | G05B 19/182 |
| | | | 700/118 |
| 2016/0161761 A1* | 6/2016 | Quere | B29C 64/124 |
| | | | 427/164 |
| 2017/0100903 A1* | 4/2017 | Rodriguez | B29D 11/00009 |

FOREIGN PATENT DOCUMENTS

| | | |
|---|---|---|
| EP | 2447046 A2 | 5/2012 |
| EP | 2447046 A3 | 10/2017 |
| WO | 2013167528 A1 | 11/2013 |

* cited by examiner

DUPLEX PRINTING OF THREE-DIMENSIONAL STRUCTURES WITH DEFORMATION CONTROL

BACKGROUND

The present invention relates to a method for printing a three-dimensional structure by depositing droplets of printing ink at least partially side by side and one above the other, comprising the following steps: depositing droplets of printing ink in a first printing step in order to build up an intermediate first pre-structure, depositing droplets of printing ink in a second printing step in order to build up an intermediate second pre-structure on at least one side of the first pre-structure and rotating the first pre-structure and arranging the first pre-structure on a support structure in a rearrangement step between the first and the second printing step.

Thus, the present invention relates to a method for double-sided or duplex printing of a three-dimensional structure by depositing droplets of printing ink at least partially side by side and one above the other.

Such a method has been described in WO2013/167528 A1. It is a drawback of named method that capillary effects draw parts of the first and/or second pre-structure in a gap between the first pre-structure and the support structure after arrangement of the first pre-structure on the support structure. Thus, the first pre-structure and hence the final three-dimensional structure comprising the first pre-structure and the second pre-structure sticks to the mold, preventing duplex printing of three-dimensional structures of a specified shape.

SUMMARY

It is therefore a purpose of the present invention to provide a method for duplex printing three-dimensional structures with improved accuracy and precision, controlling deformations of the printed pre-structures during the printing process, in particular deformations caused by capillary effects as well as gravitational forces.

This object is accomplished according to the present invention by a method for printing a three-dimensional structure by depositing droplets of printing ink at least partially side by side and one above the other, comprising the following steps: depositing droplets of printing ink in a first printing step in order to build up an intermediate first pre-structure, depositing droplets of printing ink in a second printing step in order to build up an intermediate second pre-structure on at least one side of the first pre-structure, rotating the first pre-structure and arranging the first pre-structure on a support structure in a rearrangement step between the first and the second printing step, characterized in that an extension of the first pre-structure is arranged on a carrier substructure of the support structure and a main body of the first pre-structure is arranged on an deformation-control substructure of the support structure.

It is herewith advantageously possible to prevent capillary effects from dragging parts of the pre-structures into a gap between the first pre-structure and the support structure. In this way, unwanted deformations of the pre-structures due to capillary effects are avoided. At the same time, the deformation-control substructure of the support structure protects the pre-structures from sagging due to acting gravitational forces. In this way, unwanted deformations of the pre-structures due to gravitational forces are avoided. Furthermore, the deformation-control substructure prevents deformations due to shrinking effects of the printing material, e.g. polymer shrinkage, as well as deformations caused through thermal expansion of the printing material. Thus, the present invention provides a method for duplex printing of a three-dimensional structure with an intended shape, uncompromised by deformations. On the other hand, the deformation-control substructure can also advantageously be used to introduce intended deformations, e.g. the first pre-structure may be slowly inflated in order to achieve a meniscus lens via single sided printing.

In the sense of the present invention, printing a three-dimensional structure is carried out by depositing droplets of printing ink side by side and one above the other in several consecutive depositing steps by means of a print head, wherein in each depositing step a plurality of droplets is ejected simultaneously by a plurality of ejection nozzles of the print head.

In the sense of the present invention, the final three-dimensional structure comprises the first pre-structure and the second pre-structure.

In a preferred embodiment of the present invention, the first pre-structure is rotated by 180° about a horizontal axis during the rearrangement step and the second pre-structure is printed on the underside of the first pre-structure. In this embodiment, the upper surface of the first pre-structure and the upper surface of the second pre-structure comprise a first and a second surface of the final three-dimensional structure. In this way, it is advantageously possible to provide the final three-dimensional structure with particularly smooth first and second surfaces, as the droplets deposited in the first and second printing step smear under the influence of gravity, thus smoothing the printed surfaces.

Here and in the following, "up" and "down" as well as "top" and "bottom" of printed pre-structures are determined by their order of printing: "bottom" and "down" are printed before "top" and "up".

In an alternative embodiment, the first pre-structure is rotated by any other angle during the rearrangement step and the second pre-structure is printed on that side of the first pre-structure that faces the print head. It is herewith advantageously possible to duplex print three-dimensional structures of complex shapes.

The first pre-structure is provided with an extension in the first printing step. In particular, an extension is printed as part of the first pre-structure during the first printing step. Alternatively, the extension can be provided as part of a substrate on which the first pre-structure is printed during the first printing step. The extension comprises a fixation extension, an anti-capillarity extension and/or a handling extension. The fixation extension allows a fixation of the pre-structures during the printing process. The handling extension allows an easy handling of the optical component during the printing process, preventing the actual printed structure from being deteriorated through contact. The anti-capillarity extension prevents capillary effects from dragging parts of the pre-structures into a gap between the first pre-structure and the support structure during and after the rearrangement step. In this way, unwanted deformations of the pre-structures due to capillary effects as well as a gluing of the pre-structures to the support structure are avoided.

Preferably, the first pre-structure comprises a main body and an extension, where the shape of the main body is determined by the intended shape of the final three-dimensional structure. The extension may form a seating or rim surrounding the main body of the first pre-structure. Preferably, during the printing of the first layers of the first pre-structure, the perimeter of the first pre-structure is larger than the perimeter of the main body, providing the first pre-structure with a rim or seating located at the bottom of the first pre-structure. In an alternative embodiment, the extension is provided on that side of the first pre-structure, e.g. as a seating or a rim, on which the second pre-structure is printed during the second printing step. Preferably, the first layers of the first pre-structure comprising the extension sum up to a height of 5-1000 micrometers.

During the rearrangement step, the first pre-structure is arranged on the support structure such that the extension bridges the gap between the support structure and the main body of the first pre-structure. In this way, the extension prevents capillary effects from dragging material of the first and/or second pre-structure into the gap. At the same time, the carrier substructure carries the first pre-structure at least partially, i.e. the anti-capillary extension rests on the carrier substructure. The orientation of the first pre-structure with respect to the second pre-structure is determined by the carrier substructure, preferably the shape of the upper surface of the carrier substructure.

According to a preferred embodiment of the present invention the carrier substructure comprises an outer region of the support structure and the deformation-control substructure comprises an inner region of the support structure. In a preferred embodiment, the carrier substructure comprises an outer region of the support structure on which the extension rests. In this way, capillary effects between the main body of the first pre-structure and the support structure are avoided along the full perimeter of the main body. Furthermore, the first pre-structure is supported evenly along the perimeter of the first pre-structure by the carrier substructure, whereas the main body is advantageously protected from gravitation-induced deformations through the deformation-control substructure. Alternatively, the deformation-control substructure may be used to induce intentional deformations, e.g. a slow inflation of the first pre-structure.

According to a preferred embodiment of the present invention, at least part of the first pre-structure is only partially cured at the beginning of the second printing step. In particular, a region comprising the at least one side of the first pre-structure on which printing is carried out during the second printing step is only partially cured. This enhances bonding between the only partially cured part of the first pre-structure and the structures printed on top of this part as the only partially cured droplets of the first pre-structure merge more easily and effectively with newly deposited droplets. In particular, the bonding between first and second pre-structure is enhanced in this way.

According to a preferred embodiment of the present invention, the surface of the at least one side of the first pre-structure is prepared for printing in a surface treatment step between the rearrangement step and the second printing step. In particular, the surface of the at least one side of the first pre-structure is treated such that the droplets deposited on this side during the second printing step form stable bonds with the at least one side of the first pre-structure.

Preferably, the surface is heated during the surface treatment step, most preferably such that at least part of the droplets comprising the surface are liquefied during the surface treatment step. Preferably, surface treatment comprises plasma or corona treatment of the surface. Alternatively or additionally, the surface can be structured, e.g. through laser treatment, during the surface treatment step.

According to a preferred embodiment of the present invention, droplets of printing ink are at least partially cured after deposition in intermediate curing steps during the first printing step and/or during the second printing step.

According to a preferred embodiment of the present invention, the first pre-structure is printed on a substrate in the first printing step and the substrate forms the at least one side of the first pre-structure. Printing on a substrate has several advantages. First of all, the handling of the first pre-structure during the rearrangement step is simplified as only the substrate, but not the sensitive printed parts do have to be contacted (by man or machine) during the handling. In particular, providing the extension as part of the substrate allows an easy handling of the first pre-structure. Generally, additive manufacturing through deposition, i.e. printing, of curable layers leads to deformation of the intended shape due to shrinking effects of the printing material, in particular during curing, due to material stress. Printing on a substrate prevents these shrinking effects, allowing the structure under construction to retain its intended final shape as well as the shape of its internal layered structure during the build-up of the structure. According to this embodiment of the invention, printing is carried out on a first surface of the substrate in the first printing step and on the second surface of the substrate in the second printing step. I.e. the first and second pre-structures are printed on two side of a preferably flat substrate. Hence, the three-dimensional structure comprises the substrate in addition to the first and second pre-structure. The substrate forms part of the final three-dimensional structure. Preferably, the perimeter of the substrate equals or is only marginally larger than the perimeter of the printed first pre-structure. In a preferred embodiment, the substrate extends beyond the printed first pre-structure as a rim, serving as extension and/or contact point for handling of the first pre-structure and final structure, respectively. In particular, the substrate forms a flat, preferably circular, disk. Alternatively, the substrate forms a flat sheet. In a preferred embodiment, several first and second pre-structures are printed on one such sheet. The respective final three-dimensional structures comprising each a first pre-structure, a second pre-structure and the corresponding part of the substrate are separated on the substrate, e.g. by cutting or punching. The substrate may comprise printing ink or poly (methyl methacrylate), PMMA for short. The substrate may be printed, e.g. prior to the first printing step, or produced and provided otherwise, e.g. prior to the first printing step.

According to an alternative preferred embodiment of the present invention, the first pre-structure is printed on a substrate in the first printing step and the first pre-structure is removed from the substrate between the first printing step and the rearrangement step. In this embodiment, the substrate still serves as a shrinking prevention and/or for handling of the first pre-structure. Printing of the second pre-structure is, however, carried out on the printed first pre-structure. The substrate is not contained in the final three-dimensional structure. In a preferred embodiment, the substrate forms a sheet on which several first pre-structures may be printed. The removal of the several first pre-structure occurs in one step, prior to rotating and rearranging the first pre-structures. The sheet may comprise PMMA. The at least one first pre-structure may be removed from the substrate through bending or flexing of the substrate.

According to a preferred embodiment of the present invention, at least part of the support structure is printed between the first printing step and the second printing step. In this way, a support structure specifically adapted to the structure to be printed is advantageously provided.

Preferably, the printing data of the three-dimensional structure can be used to determine the printing data for the print of the at least part of the support structure. Moreover, the support structure is advantageously provided directly inside the printer at the location where the second printing step is carried out. In a preferred embodiment, at least part of the carrier substructure is printed. Alternatively or additionally, at least part of the deformation-control substructure is printed. In this way, it is possible to choose the material for the two substructures according to their functions. In a preferred embodiment, the entire carrier substructure is printed. In another preferred embodiment, the entire deformation-control substructure is printed.

According to a preferred embodiment of the present invention, the carrier substructure and the deformation-control substructure are printed as a single piece. Printing the entire support structure in a single piece, a particularly simple and easy-to-produce support structure is provided. The duplex printing method is simplified and sped up in this way. In particular, the deformation-control substructure comprises a mold of that part of the first pre-structure that is arranged inside the deformation-control substructure during the rearrangement step. Printing data of the first and second pre-structures are preferably used to determine the printing data for the support structure. In this way, also complex structures can be efficiently supported and protected from gravitational deformation during the duplex printing process. The carrier substructure is preferably printed as an outer ring extending beyond the mold, providing a seating for the extension. Preferably, the top surface of the carrier substructure is flat. The support structure may comprise a coating, e.g. for easy removal of the finished structure from the support structure.

According to a preferred embodiment of the present invention, the carrier substructure comprises pillars. The pillars are preferably equidistantly spaced along the perimeter of the first pre-structure. The first pre-structure rests on the carrier substructure only in discrete supporting points. The pillars may be printed, e.g. between the first printing step and the rearrangement step. This allows a simple and efficient adaptation of the pillar arrangement, height and width to the shape of the three-dimensional structure to be printed. In particular, printing data of the three-dimensional structure can be used to determine pillar arrangement, height and width. Alternatively, the pillars are produced and provided otherwise. It is conceivable that the pillars or at least some of the pillars comprise suspension points for the suspension of the deformation-control substructure from the carrier substructure.

According to a preferred embodiment of the present invention, the deformation-control substructure comprises a soft-condensed matter sheet. In particular, the sheet is suspended from the carrier substructure. The carrier substructure may comprise pillars or not. The sheet may be preformed, e.g. adapted to the shape of the first pre-structure before the rearrangement step. Thickness, size and material of the sheet are determined by the weight and dimensions of the structure to be build.

According to a preferred embodiment of the present invention, the deformation-control substructure comprises a soft-condensed matter block. The block may be fixed to the carrier substructure or not. The surface of the block is preferably determined by the shape of the first pre-structure. In particular, the surface of the block is shaped such that the main body of the first pre-structure can be rested at least partially, preferably completely, on the block surface.

According to a preferred embodiment of the present invention, the deformation-control substructure comprises a balloon. The balloon is used to support the main body of the first pre-structure against gravitational forces. In particular, the air pressure inside the balloon may be adapted such that the gravitationally induced sagging effects are avoided. The balloon preferably adapts to the shape of the first pre-structure in the rearrangement step, but does not alter after its initial adaptation. Alternatively, the shape of the balloon is adjusted at certain intervals, e.g. the shape of the balloon may be adapted after printing of a layer is completed and before the following layer is printed. In a preferred embodiment, the deformation-control substructure comprises multiple balloons. In particular, the deformation-control substructure comprises multiple ring-shaped balloons. Alternatively, the deformation-control substructure comprises column-shaped balloons. The column-shaped balloons are preferably arranged in a grid.

According to a preferred embodiment of the present invention, the profile of the upper surface of the deformation-control substructure comprises a negative of the profile of the opposite side of the at least one side of the first pre-structure. In this way, it is advantageously ensured that the shape of the first pre-structure remains unaltered after arrangement on the support structure. In particular, the upper surface of the deformation-control substructure prevents deformations of the first pre-structure and thus consequently of the second pre-structure due to gravitation-induced sagging of the structure. Preferably, the printing data, e.g. CAD data, of the intended three-dimensional structure are used to determine the surface profile of the upper surface of the deformation-control substructure.

According to a preferred embodiment of the present invention, droplets of printing ink are at least partially cured after deposition in intermediate curing steps during the first printing step and/or during the second printing step. Curing is preferably carried out through light irradiation, in particular with UV light. Wavelength, intensity and polarization of the irradiated light may vary during the process and/or across the structures. These parameters of the irradiated light may be varied to achieve different curing properties in the respective curing steps. Preferably, the printing ink comprises an UV curable liquid monomer becoming a polymer if being cured.

According to a preferred embodiment of the present invention, the deposited droplets are cured only after a certain time period has elapsed in order to let the deposited droplets spread and/or melt with adjacent droplets before getting cured. During the certain time period, gravity acts on the deposited droplets, smearing and spreading them. In this way, a particularly smooth surface is formed. It is this gravitational smoothening that makes the duplex printing of three-dimensional structures so attractive for high-accuracy applications. With the duplex printing method of the present invention, both, the first and the second surface of the final three-dimensional structure are printed under the beneficial smoothening force of gravity. During the first and second printing step, the gravitational force comprises a downwards pointing component tangent to the first and second surface, respectively. In single-side printing methods, the first or second surface has to be provided through printing e.g. in a mold. The surfaces achieved in this way never provide the accuracy of gravitationally smoothened surfaces. Moreover, duplex printing allows to print structures with free overhanging parts within a limited geometry as a support can be easily provided for the free overhanging parts in the duplex printing method.

One application of the present invention that requires particularly high accuracy is the printing of optical components.

According to a preferred embodiment of the present invention, the rotation and arrangement of the first pre-structure during the rearrangement step is carried out in an automated process. A manual handling, in particular of delicate structures, is herewith advantageously avoided. In particular, the first pre-structure is automatically rotated and inserted into the support structure. This provides an efficient and fast production method for duplex printing of three-dimensional structures. In a preferred embodiment, the support structure is brought into contact with the upper surface of the first pre-structure and the first pre-structure rotated together with the support structure. Thus, the first pre-structure is arranged on or in the support structure before the rotation of the first pre-structure. It is herewith advantageously possible to arrange and rotate the first pre-structure without deforming the first pre-structure through contact. In particular when a substrate is used in the first printing step, the first pre-structure is protected between the substrate and the support structure during the rearrangement step. The rearrangement step is thus easily automated.

It is conceivable that several first pre-structures are printed, preferably on one or several substrates, in the first printing steps. The substrate or substrates may be printed or loaded into the printer. During the rearrangement step, these are removed from the respective substrate or substrates. Several support structures are provided, e.g. printed or loaded into the printer, and the first pre-structures rotated and arranged inside the respective support structure, before printing of the second pre-structures is carried out in the second printing step. It is conceivable that the structures are coated, edged, framed or otherwise post-processed after the second printing step, either after removal from the printer or in the printer itself.

Another subject of the present invention is a three-dimensional structure printed by a method according to any of the claims 1 to 16, wherein the printed three-dimensional structure comprises the first pre-structure, the second pre-structure and the extension. In this way, a three-dimensional structure is provided wherein the shape of the structure coincides with the intended shape at a higher level of accuracy. Through the duplex printing process, smooth first and second surfaces of the structure are obtained, in particular through gravitational smoothening. In particular, the three-dimensional structure is an optical structure printed at least partially from transparent or translucent printing ink. Alternatively, the three-dimensional structure may be any other structure printed with the above described methods.

Another subject of the present invention is a printer for printing three-dimensional structures with a method according to any of the preceding claims 1 to 17. Herewith, a printer for duplex printing of three-dimensional structures is advantageously provided. Preferably, the printer comprises a printing unit and a curing unit, in particular for curing with UV light.

BRIEF DESCRIPTION OF THE DRAWINGS

FIG. 1 does not refer to an exemplary embodiment of the present invention, but is used to illustrate general technical background.

DETAILED DESCRIPTION

The present invention will be described with respect to particular embodiments and with target to certain drawings but the invention is not limited thereto but only by the claims. The drawings described are only schematic and are non-limiting. In the drawings, the size of some of the elements may be exaggerated and for illustrative purposes may not be drawn to scale.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figures 1, 2:
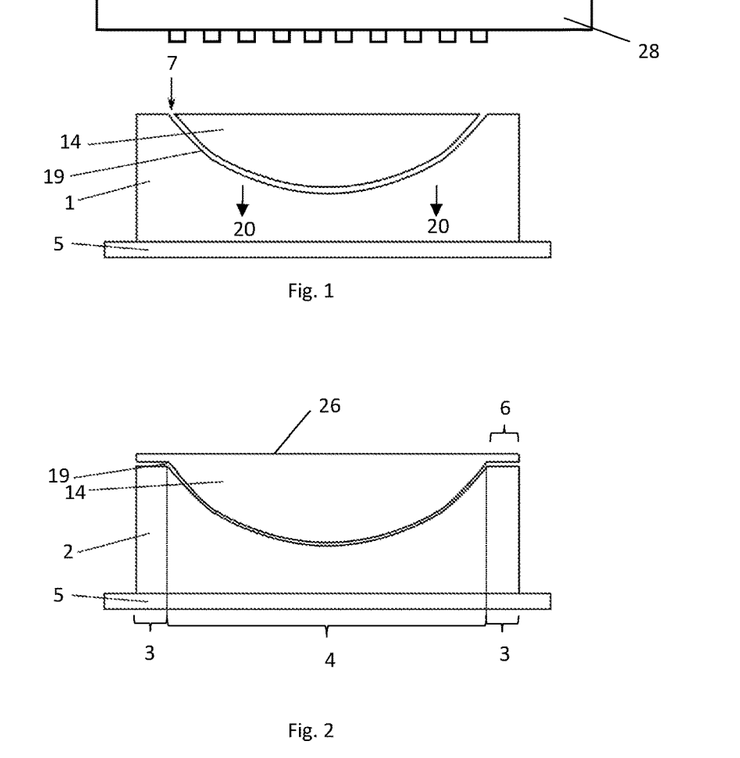
FIG. 1 schematically illustrates a printing method for printing three-dimensional structures.
FIG. 2 schematically illustrates a printing method according to an exemplary embodiment of the present invention.

In FIG. 1, a printing method for printing three-dimensional structures 18 is schematically illustrated. The three-dimensional structure 18 is printed in an inkjet or 3d printing process by depositing droplets of printing ink at least partially side by side and one above the other, building up the three-dimensional structure 18 in a layered fashion. In a first printing step, a first pre-structure 14 of the three-dimensional structure 18 is printed. During a rearrangement step, the first pre-structure 14 is flipped upside down and inserted into a mold 1. The mold upholds the first pre-structure 14 during the second printing step. During the second printing step, a second pre-structure 15 is printed on the underside of the first pre-structure 14. Due to the unavoidable gap 19 between the first pre-structure 14 and the mold, capillary action 7 drags printing material, from the first and/or the second printing step, into the gap 19. In this way, the three-dimensional structure 18 under construction is deformed and glued to the mold. The shape of the layered structure and/or the shape of the final three-dimensional structure 18 is impaired. The capillary effects prevent the layered structures during the printing process and/or the final three-dimensional structure from retaining their intended shape. In particular, the first pre-structure 14 is permanently joined to the mold. Additionally, the first pre-structure 14 is subject to gravitational forces 21. These may or may not be sufficiently canceled by the support through the mold 1, depending on the smoothness of the mold upper surface, its shape etc. Without any supporting structure, the acting gravitational forces 20 deform the first pre-structure, i.e. the first pre-structure sags under gravitational forces. It is an object of the present invention, to overcome these deficiencies of printing processes known from the prior art and provide a true duplex printing method that provides high accuracy and precision in the printing of three-dimensional structures of a specified shape.

In FIG. 2, a printing method according to an exemplary embodiment of the present invention is schematically illustrated. The three-dimensional structure 18 to be printed is printed during two printing steps. In a first printing step, a first pre-structure 14 of the three-dimensional structure 18 is printed through deposition of droplets of printing ink at least partially side by side and one above the other in a 3d printing process. The three-dimensional structure 18 is thus build up layer by layer. Preferably, the droplets of printing ink are at least partially cured during intermediate curing steps. Preferably, the printing ink comprises a UV curable monomer that becomes a polymer under curing. Curing is preferably carried out through irradiation with light, in particular UV light. Preferably, between the deposition of droplets of printing ink and the curing a certain time interval elapses during which the droplets of printing ink flow. In particular, the droplets flow under the influence of gravitation following a force tangential to the surface of the pre-structure built during the previous printing steps. The gravitational force thus constitutes a smoothening force. In this way, a particularly smooth surface of the printed layer as well as of the final printed first and/or second pre-structure 14, 15 is provided. The droplets of printing ink are ejected from ejection nozzles of a print head 28 of a printer, preferably an inkjet or droplet-on-demand printer. The droplets are ejected towards a printing plate 5. Alternatively, a substrate 17 can be provided on the printing plate 5 and the droplets are deposited on named substrate 17. The substrate 17 advantageously prevents shrinking effects of the deposited layers, in particular during curing. The first printed layer is fixed to the substrate 17, preventing the first layer to shrink under residual stress induced during subsequent curing of that layer. E.g. the printed structure may shrink through polymer shrinkage by 1-20%. Retaining the layer structure of the pre-structure 14, 15 under construction is particularly important for optically transparent structures, e.g. optical components such as lenses, and structures into which functional components are integrated in predefined locations. Preferably, the first pre-structure 14 is provided with an extension 6. The extension inhibits capillary effects between the first pre-structure and the support structure 2. The extension 6 may form of the substrate 17 if the first pre-structure 14 is printed on a substrate 17 and the substrate 17 is not removed after the first printing step. In particular, the substrate 17 may extend beyond the perimeter of the printed first pre-structure 14, thus forming an extension in the form of a seating or rim on the first pre-structure 14. For the purpose of this document, the substrate 17 forms part of the first pre-structure 14. If printing of the first pre-structure 14 is not carried out on a substrate 17 or the substrate 17 is removed after the first printing step, an extension is preferably printed as part of the first pre-structure 14 during the printing of the first layers. In particular, the first layers are printed with a larger perimeter than the actual shape of the three-dimensional structure 18 to be printed has. Preferably, the first layers extend beyond the perimeter of a main body of the first pre-structure 14. The extension is preferably thinner than 1000 micrometers, particularly preferably between 100 and 1000 micrometers thick. The first printing step ends when the first pre-structure 14 is finished. The first printing step is followed by a rearrangement step during which the first pre-structure 14 is rotated and arranged on a support structure 2. The rotation is preferably by 180°, flipping the first pre-structure 14 upside down. Rotation by any other angle is conceivable as well. The rotation angle depends on the shape of the three-dimensional structure 18 to be printed. The first pre-structure 14 is rotated such that at least one side 26 of the first pre-structure 14 faces the print head 28. The rotation and arrangement during the rearrangement step may be carried out manually or automatically. Preferably, handling of the first pre-structure is contact free. Particularly, the extension 6 is used for handling of the pre-structures 14, 15. During the second printing step, droplets of printing ink are deposited on this at least one side 26. The support structure 2 comprises a carrier substructure 3 and an deformation-control substructure 4. The first pre-structure 14 is arranged on the support structure 2 such that the extension 6 rests on the carrier substructure 3. The main body of the first pre-structure 14 preferably rests on the deformation-control substructure 4. Whereas the extension in conjunction with the carrier substructure inhibits capillary effects, the deformation-control substructure 4 prevents sagging of the pre-structures 14, 15 under the influence of gravitational forces. The upper surface of the deformation-control substructure 4 is therefore preferably shaped such that it perfectly fits the shape of the rotated first pre-structure 14 when arranged on the support structure 2. In particular, the profile of the upper surface of the deformation-control substructure 4 is negative of the profile of the first pre-structure 14, in particular of the profile of that side of the first pre-structure 14 that lies opposite of the at least one side 16. In a preferred embodiment, the support structure 2 is printed as a single-piece mold with carrier substructure 3 and deformation-control substructure 4. Preferably, the support structure 2 is printed after the first printing step. Alternatively, the support structure 2 may be provided after the first printing step. As soon as the first pre-structure 14 is arranged on the support structure 2, printing of the second pre-structure 15 can begin during the second printing step. Preferably, the at least one side 26 of the first pre-structure 14 is not fully cured during the first printing step. In this way, droplets of printing ink deposited on the at least one side 26 during the second printing step bond more easily and more effectively to the at least one side 26. Alternatively or additionally, the at least one side 26 may be prepared during a surface preparation step before the second printing step. E.g. the surface of the at least one side 26 may be roughened through engraving or otherwise. Adhesion properties are improved in this way, resulting in a more stable and more reliable three-dimensional structure 18. It is also conceivable that the at least one side is heated before the second printing step in order to merge or coalesce the droplets constituting the surface of the at least one side 26, enhancing bonding of the second pre-structure 15 to the first pre-structure 14. Printing of the second pre-structure 15 during the second printing step involves the same techniques as the printing of the first pre-structure 14 during the first printing step. After completion of the second pre-structure 15, the final structure 18 may be subject to post-processing steps such as coating or final hardening or curing. At the end of the second printing step, the three-dimensional structure 18 is removed from the printer. Further processing, such as cutting, casting, framing or edging may follow.

Figure 3:
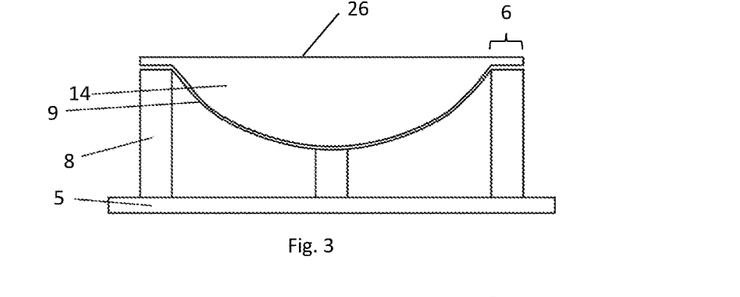
FIG. 3 schematically illustrates a support structure according to an exemplary embodiment of the present invention.

In FIG. 3, a support structure 2 according to an exemplary embodiment of the present invention is schematically illustrated. The present embodiment differs from the embodiment depicted and described in FIG. 2 in the support structure 2. The support structure 2 comprises a carrier substructure 3 and an deformation-control substructure 4.

The carrier substructure 3 comprises pillars 8 on which the pre-structures 14, 15, in particular the extension 6 of the first pre-structure 14 are pointwise supported. The pillars 8 are preferably arranged along the perimeter of the first pre-structure 14, in particular the extension 6. In particular, the pillars 8 are equidistantly spaced. From the pillars 8, the deformation-control substructure 4 is suspended. The deformation-control substructure 4 comprises a sheet 9, in particular a soft-matter sheet 9. The sheet 9 may comprise any flexible and sufficiently smooth material. Preferably, the sheet 9 adapts to the form of the first pre-structure 14. The pillars 9 may be solid or hollow. The pillars 9 may be printed between the first printing step and the rearrangement step or the pillars 9 may be otherwise provided, e.g. loaded from a stack. The pillars 9 may be connected to fix their arrangement, e.g. through a ring-like structure that connects the bottom of the pillars 9. In this way, the pillar arrangement is stabilized and kept fixed. The pillars 9 may move in the vertical direction, i.e. in the printing direction, as a dynamic response to a measurement of the surface of the second pre-structure during the second printing step.

Figure 4:
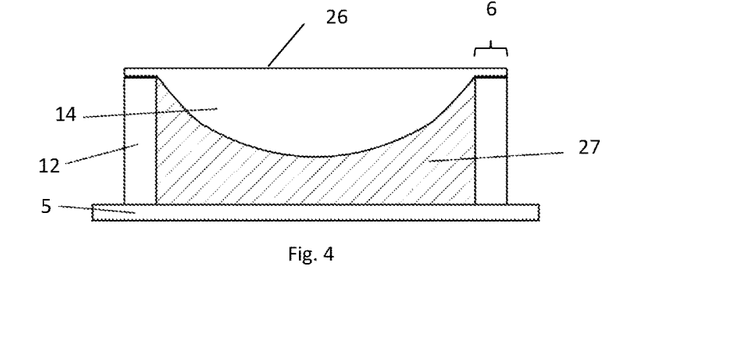
FIG. 4 schematically illustrates a support structure according to an exemplary embodiment of the present invention.

In FIG. 4, a support structure 2 according to an exemplary embodiment of the present invention is schematically illustrated. The present embodiment differs from the embodiment depicted and described in FIG. 2 in the support structure 2. The support structure 2 comprises a carrier substructure 3 and an deformation-control substructure 4. The carrier substructure 3 comprises a ring 12 on which the pre-structures 14, 15, in particular the extension 6 of the first pre-structure 14 rest. The ring 12 may be solid or hollow. The deformation-control substructure 4 comprises a soft-matter block 27. The main body of the first pre-structure 14 rests on the soft-matter block 27, in particular on the upper surface of the soft-matter block 27. The soft-matter block is comprised of soft matter, e.g. rubber. The upper surface of the soft-matter block 27 comprises a profile that is the negative of the profile of the side of the first pre-structure 14 opposite to the at least one side 26. The soft-matter block 27 may be fixed to the carrier substructure 3 or not. Instead of a soft-matter block 27, the deformation-control substructure 4 may comprise a balloon, whose size can be easily adapted to the shape and size of the first pre-structure 14.

Figure 5:
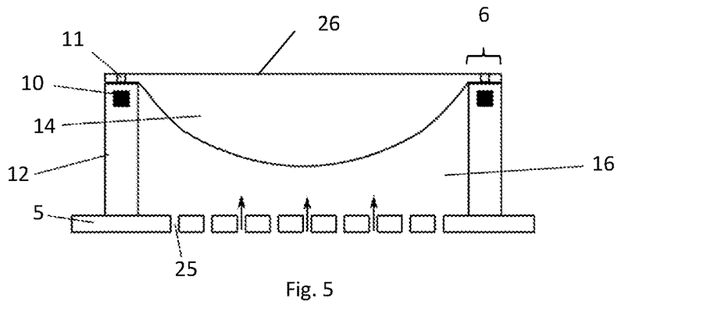
FIG. 5 schematically illustrates a support structure according to an exemplary embodiment of the present invention.

In FIG. 5, a support structure 2 according to an exemplary embodiment of the present invention is schematically illustrated. The present embodiment differs from the embodiment depicted and described in FIG. 2 in the support structure 2. After the first printing step, the first pre-structure 14 is lifted from the printing plate 5, rotated and arranged on a support structure 2 in a rearrangement step. Preferably, the first pre-structure is flipped by 180° so that the underside 26 of the first pre-structure 14 faces the ejection nozzles of the print head 28. In particular, the first pre-structure 14 is arranged on the support structure 2 such that the extension 6 rests on a carrier substructure 3 of the support structure 2 and the main body of the first pre-structure 14 is supported by an deformation-control substructure 3. The deformation-control substructure 4 comprises a pressure chamber 16. The extension 6 seals off the pressure chamber 16 against the carrier substructure 3. Between the extension 6 and the carrier substructure 3 a seal may be provided. Whereas the extension 6 in conjunction with the carrier substructure 3 prevents the occurrence of capillary effects and corresponding capillary-induced deformations, the deformation-control substructure 4 prevents gravitationally-induced deformations, in particular sagging of the pre-structures 14, 15. In particular, the pressure in the pressure chamber 16 is adjusted in order to cancel the gravitational forces causing a sagging of the pre-structures 14, 15. To this end, a control medium is injected into the pressure chamber 16. The control medium comprises a liquid or gas, preferably air. The control medium may be injected through openings 25 in the printing plate 5. Preferably, the pressure in the pressure chamber 16 can be monitored and controlled, i.e. adapted and changed. The pressure inside the pressure chamber 16 may be uniform across the first pre-structure 14. Alternatively, the carrier substructure 3 comprises at least semi-open elements which generate a pressure gradient across the first pre-structure 14. The rearrangement step may comprise a surface preparation step in which the surface of the side of the first pre-structure facing the ejection nozzles at the end of the rearrangement step is treated in order to improve its adhesion properties. If the first layers of the first pre-structure 14 are only partly cured, such a surface preparation step may not be necessary and the only partly cured droplets of printing ink melt and bond efficiently with the droplets deposited during the second printing step. Alternatively and additionally, the surface may be heated or roughened, e.g. through engraving, in order to enhance its adhesion properties. Printing of the second pre-structure 15 is carried out in the second printing step. The second pre-structure is printed on the side of the first pre-structure 14 facing the ejection nozzles of the print head 28, preferably the bottom, i.e. first layers of the first pre-structure 14. In this way, a flat substrate for the second printing step is provided. If the first pre-structure 14 has been printed on a substrate 17, this substrate 17 may be removed during the rearrangement step or form part of the first pre-structure 14 and thus of the final three-dimensional structure 18. In this embodiment, droplets are deposited on the underside of the substrate 17 during the second printing step. In a preferred embodiment, measurements are carried out on the first and/or second pre-structures 14, 15 in order to determine deformations of the pre-structures 14, 15. Preferably, the surface properties of the first and/or second pre-structures 14, 15 are determined. Surface properties include profiles, height, distance to the measurement unit or any other reference point, deformations of the surface, height variations, gradients etc. Preferably, the pressure in the pressure chamber 16 is adjusted depending on the detected deformations of the pre-structures 14, 15. In this way, a feedback loop is advantageously provided which allows a continuous adaptation of the deformation-control substructure 4, in particular the pressure in the pressure chamber 16, on the actual acting forces and deformations. In a preferred embodiment, surface measurements are carried out on the upper surface, i.e. the last printed layers, of the first pre-structure 14. These measurements may be carried out from below or above the first pre-structure 14, preferably from below. E.g. surface properties may be determined through laser measurements such as laser triangulation and/or white light scanning (coherence scanning interferometry) and/or confocal chromatic measurement. Measurements may be carried out in full surface scans or fast line scans or area- or pointwise. Additionally, printing data may be used to adjust the pressure in the pressure chamber 16, preferably in conjunction with the measurement results. This is particularly beneficial if surface properties of the second pre-structure 15 are determined during the measurement steps. Whereas for the first pre-structure 14, the measurement establishes whether or not the first pre-structure 14 retains its initial shape, in case of the second pre-structure 15, the measurement has to establish whether or not the second pre-structure 15 retains or obtains its desired shape. The printing data, in particular of the second pre-structure 15, are thus useful in comparing the measured with the intended shape. The pressure in the pressure chamber 16 exerts an upwards directed force on the pre-structures 14, 15 that may lift up or otherwise delocate the pre-structures 14, 15. To prevent such an unwanted movement of the pre-structures 14, 15, the support structure 2, in particular the carrier substructure 3, comprises a fixation means. The fixation means fixes or clamps the first pre-structure 14, preferably the extension 6, to the carrier substructure 3. The first pre-structure 14 is preferably fixed to the carrier substructure from the moment in which the pressure is injected into the pressure chamber 16 until the pressure is released and the final three-dimensional structure 18 removed from the printer at the end of the second printing step. Preferably, the fixation means exerts a controllable force on the first pre-structure 14, preferably in conjunction with a second fixation means provided in the first pre-structure 14. In a preferred embodiment, the fixation means comprises an electromagnetic element 10 of the carried substructure and an electromagnetic element 11 located in the extension 6. In the present embodiment, where the carrier substructure 3 forms a ring, the electromagnetic element 10 may comprise a ring-shaped electromagnet along the perimeter of the carrier substructure 3. Alternatively, the electromagnetic element 10 comprises several electromagnets that are spaced equidistantly along the perimeter of the carrier substructure 3. The electromagnetic element 11 may comprise a metallic ring or a ring-shaped electromagnet. The reverse arrangement is also conceivable: the carrier substructure 3 may comprise a metallic ring, whereas the extension 6 provides the ring-shaped electromagnet. When e.g. the electromagnet 10 is turned on, the first pre-structure 14 is clamped to the carrier substructure 3. The clamping or fixation force can be controlled through the strength of the electromagnetic force exerted by the electromagnet. This force may be adapted depending on the exerted pressure in the pressure chamber 16 and thus change during the printing process. At the end of the second printing step, the electromagnet may be turned off or its polarity reversed in order to lift off the final three-dimensional structure 18 from the support structure 2. The second printing step may involve post-processing steps such as final curing or hardening or coating.

Figure 6:
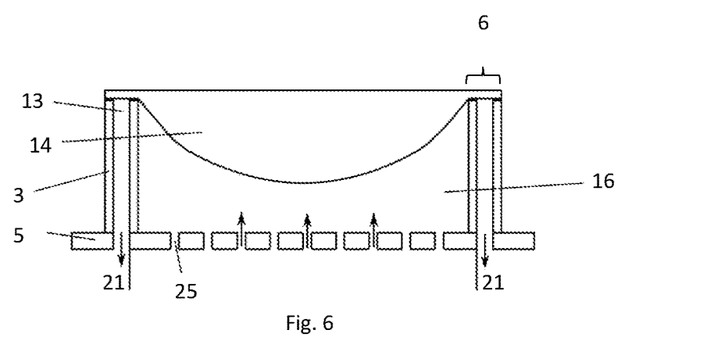
FIG. 6 schematically illustrates a support structure according to an exemplary embodiment of the present invention.

In FIG. 6, a support structure 2 according to an exemplary embodiment of the present invention is schematically illustrated. The present embodiment differs from the embodiment depicted and described in FIG. 5 in the fixation means. The fixation means in the present embodiment comprises a vacuum chamber 13. The vacuum chamber 13 is provided as part of the carrier substructure 3. Preferably, the carrier substructure 3 comprises a hollow ring, inside of which a vacuum chamber 13 is provided. In particular, the carrier substructure 3 comprises an inner part, an outer part and a space enclosed by the inner and outer parts and sealed at the top through the extension 6. This space comprises a vacuum chamber 13. Preferably, the inner and outer parts constitute inner and outer walls of the carrier substructure 3. Alternatively, the carrier substructure 3 comprises hollow pillars inside of which vacuum chambers 13 are located, respectively. The first pre-structure 14 is clamped or fixed to the carrier substructure 3 through the application of a vacuum 21 in the vacuum chamber 13. Preferably, the strength of the applied vacuum 21 is adjusted depending on the pressure exerted in the pressure chamber 16. Additionally, printing data may be used to determine the strength of the applied vacuum 21. Preferably, the vacuum 21 is applied before or at the instant in which the control medium is injected into the pressure chamber 16. The vacuum 21 is preferably turned off at the end of the second printing step in order to release the final three-dimensional structure 18.

Figure 7:
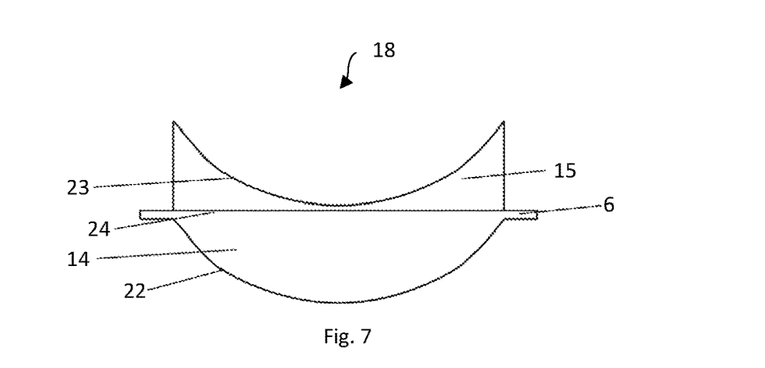
FIG. 7 schematically illustrates a printed three-dimensional structure according to an exemplary embodiment of the present invention.

In FIG. 7, a printed three-dimensional structure 18 according to an exemplary embodiment of the present invention is schematically illustrated. The three-dimensional structure 18 comprises a first pre-structure 14 and a second pre-structure 15 as well as an extension 6. The extension 6 forms part of the first pre-structure 14. In particular, the extension 6 comprises a seating or rim along the perimeter of the first pre-structure 14. The first and second pre-structures 14, 15 may comprise optical components. In particular, the first and second pre-structures comprise plan-convex and/or plan-concave lens structures. The first and second pre-structures 14, 15 are printed in a duplex printing process by depositing droplets of printing ink at least partially side by side and one above the other. The first and second pre-structures 14, 15 are therefore build up from layers of printing ink. The first and second pre-structures 14, 15 both comprise a layered structure. The duplex printing process provides a final three-dimensional structure 18 with particularly smooth first and second surfaces 22, 23. These first and second surfaces 22, 23 are the upper surfaces of the first and second pre-structure 14, 15, respectively. The upper surface 22 of the first pre-structure 14 comprises the last layers printed during the first printing step. The upper surface 23 of the second pre-structure 15 comprises the last layers printed during the second printing step. During the first and second printing step, droplets of printing ink are smeared under the influence of a gravitational force that advantageously acts tangential to the surface of the just printed layer. In this way, gravitation can be exploited to obtain a particularly smooth surface, both of the printed layer at hand as well as of the final three-dimensional structure 18. This is particularly beneficial for three-dimensional structures 18 that are optically transparent, i.e. for optical components, in particular lenses. The second pre-structure 15 is printed on the at least one side 26 of the first pre-structure 14 during the second printing step. The central surface 24 which is the surface of contact of the first and second pre-structures 14, 15 preferably constitutes thus a central plane 24. This central plane 24 provides a flat substrate for the second printing step. The at least one side 26 is preferably treated in a surface preparation step. In particular, the adhesion properties of the at least one side 26 are enhanced during the surface preparation step. Preferably, the at least one side 26 is heated or roughened, e.g. through engraving, before the second printing step. Preferably, the extension is printed as part of the first layers of the first pre-structure 14 during the first printing step. The extension 6 may be removed after removal of the three-dimensional structure 18 from the printer in a post-processing step. If the three-dimensional structure 18 comprises an optical component, in particular a lens or lens blank, the extension 6 does not need to be removed if the lens is framed, edged or cut in post-processing step, e.g. during fitting the lens to a pair of glasses. If the lens is directly printed in its final shape, a removal of the extension 6 in the post-processing step is necessary.

Figure 8:
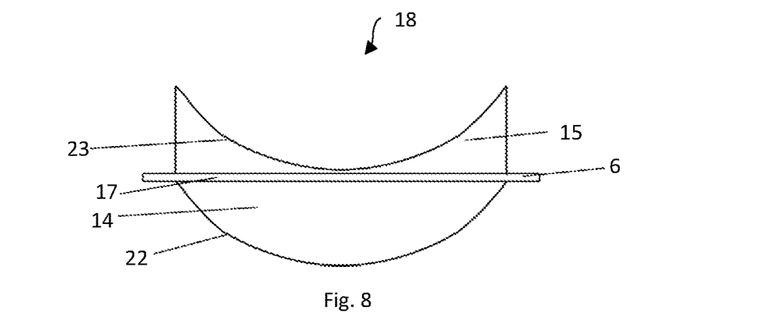
FIG. 8 schematically illustrates a printed three-dimensional structure according to an exemplary embodiment of the present invention.

In FIG. 8, a printed three-dimensional structure 18 according to an exemplary embodiment of the present invention is schematically illustrated. The three-dimensional structure 18 differs from the exemplary embodiment of the three-dimensional structure 18 depicted and described in FIG. 7 in so far as the three-dimensional structure 18 of the present embodiment comprises a substrate 17. The first pre-structure 14 is printed on a substrate 17 during the first printing step. The substrate 17 provides a flat surface on which the first layers of the first pre-structure 14 are printed. In particular, the substrate 17 inhibits shrinking effects that otherwise occur during the printing process, especially during curing, due to acting residual stresses. Thus, due to the substrate 17, the first pre-structure 14 retains its layered structure as well as its intended final shape. This is particularly important for optically transparent structures as well as structures into which functional components are integrated. In both cases, the layered structure needs to be controlled and retained. The first pre-structure 14 is printed on a first side of the substrate 17. The substrate 17 forms part of the first pre-structure 14 at the end of the first printing step. The side opposite the first side of the substrate 17 forms the at least one side 26 of the first pre-structure 14. The second pre-structure 15 is printed on the at least one side 26 of the first pre-structure 14, i.e. on the side opposite to the first side of the substrate 17. In this way, also the second pre-structure 15 retains its layered structure and intended final shape. In particular, shrinking effects are suppressed. The substrate 17 preferably comprises a flat substrate 17, particularly preferably a flat disk 17. The diameter of the flat disk 17 extends beyond the perimeter of the printed first pre-structure 14. In this way, an extension 6 is advantageously provided. The substrate 17 comprises the extension 6. The three-dimensional structure 18 thus comprises a first pre-structure 14, a second pre-structure 15, as well as a substrate 17 and an extension 6. The substrate 17 may be treated during a surface preparation step before the second printing step in order to enhance adhesion properties of the substrate 17. The substrate 17 may be heated or roughened, e.g. through engraving, during the surface preparation step. The substrate 17 may be printed or otherwise be provided, e.g. prefabricated and loaded into the printer. The printed substrate 17 may comprise printing ink identical to the printing ink used during the first and/or second printing ink. This alleviates the bonding properties to the first and second pre-structures 14, 15. Alternatively, the substrate is not printed, but e.g. produced by any other conventional means. For an optical component, the substrate 17 preferably comprises a transparent or translucent material. In a preferred embodiment, the substrate 17 is formed by casting.

KEY TO FIGURES

1 Mold
2 Support structure
3 Carrier substructure
4 Deformation-control substructure
5 Printing plate
6 Extension
7 Capillary action
8 Pillar
9 Sheet
10 Electromagnetic element of the carrier substructure
11 Electromagnetic element of the first pre-structure
12 Ring
13 Vacuum chamber
14 First pre-structure
15 Second pre-structure
16 Pressure Chamber
17 Substrate
18 Three-dimensional structure
19 Gap
20 Gravitational force
21 Application of vacuum
22 Upper surface of the first pre-structure
23 Upper surface of the second pre-structure
24 Central surface
25 Openings in printing plate
26 At least one side of the first pre-structure
27 Soft-matter block
28 Print head

What is claimed is:

1. A method for printing a three-dimensional structure by depositing droplets of printing ink at least partially side by side and one above an other, comprising the following steps:
    depositing droplets of printing ink in a first printing step in order to build up an intermediate first pre-structure;
    depositing droplets of printing ink in a second printing step in order to build up an intermediate second pre-structure on at least one side of the first pre-structure;
    rotating the first pre-structure and arranging the first pre-structure on a support structure in a rearrangement step between the first printing step and the second printing step;
    wherein an extension of the first pre-structure is arranged on a carrier substructure of the support structure and a main body of the first pre-structure is arranged on a deformation-control substructure of the support structure;
    wherein the first pre-structure is fixed by a fixation means on the carrier substructure;
    wherein the deformation-control substructure protects at least the first pre-structure from unwanted deformations; and
    wherein the fixation means comprises an electromagnetic element of the carrier substructure and an electromagnetic element located in the extension.

2. The method according to claim 1, wherein the carrier substructure comprises an outer region of the support structure and the deformation-control substructure comprises an inner region of the support structure.

3. The method according to claim 1, wherein at least part of the first pre-structure is only partially cured at the beginning of the second printing step.

4. The method according to claim 1, wherein a surface of the at least one side of the first pre-structure is prepared for printing in a surface treatment step between the rearrangement step and the second printing step.

5. The method according to claim 1, wherein the first pre-structure is printed on a substrate in the first printing step and the substrate forms the at least one side of the first pre-structure.

6. The method according to claim 1, wherein the first pre-structure is printed on a substrate in the first printing step and the first pre-structure is removed from the substrate between the first printing step and the rearrangement step.

7. The method according to claim 1, wherein at least part of the support structure is printed between the first printing step and the second printing step.

8. The method according to claim 1, wherein the carrier substructure and the deformation-control substructure are printed as a single piece.

9. The method according to claim 1, wherein the carrier substructure comprises pillars.

10. The method according to claim 1, wherein the deformation-control substructure comprises a soft-condensed matter sheet.

11. The method according to claim 1, wherein the deformation-control substructure comprises a soft-condensed matter block.

12. The method according to claim 1, wherein the deformation-control substructure comprises a balloon.

13. The method according to claim 1, wherein a profile of an upper surface of the deformation-control substructure comprises a negative of a profile of an opposite side of the at least one side of the first pre-structure.

14. The method according to claim 1, wherein droplets of printing ink are at least partially cured after deposition in intermediate curing steps during the first printing step and/or during the second printing step.

15. The method according to claim 14, wherein the deposited droplets are cured only after a certain time period has elapsed in order to let the deposited droplets spread and/or melt with adjacent droplets before getting cured.

16. The method according to claim 1, wherein rotation and arrangement of the first pre-structure during the rearrangement step is carried out in an automated process.

* * * * *